2,797,210

POLYBUTADIENE THERMAL REACTION PRODUCTS FROM ORGANO FREE RADICAL MASS CATALYSIS AND METHODS OF PRODUCING THE SAME

Oliver Wallis Burke, Jr., Grosse Pointe Park, Mich.

No Drawing. Application November 1, 1951, Serial No. 254,454

4 Claims. (Cl. 260—94.7)

This invention relates to the art of producing hydrocarbon dielectric and structural materials and aims generally to improve the same.

Particular objects of the invention, severally and interdependently, are to produce solid materials that have extremely low dielectric constants at high electrical frequency; that maintain low dielectric constants over an extreme range of temperatures; that have extreme hardness and resistance to abrasion, mechanical shock and like stresses; that have chemical stability and thermal stability at high temperatures of the order of 250 to 300 degrees C.; that may be generated in pre-formed shapes and may be machined after generation; and that are readily produced by a relatively simple and inexpensive process.

Further objects of the invention, severally and in combination, are to provide a relatively simple and cheap process of producing such materials from available raw materials and to provide particular steps and sub-combinations of steps in such process to enable it to be applied to materials that are readily obtained or produced without excessive cost.

Yet another object of the invention is to provide a method of making such materials from polymerized monomers formed in such manner that after polymerization, all need for freeing the polymer of ash forming materials or separate phase materials is eliminated.

Other and further objects and advantages of the invention will become apparent from the following description of exemplary embodiments thereof.

Various polymerization products, such as polystyrene, polyethylene, and polyisobutylene, when properly prepared have excellent electrical properties at high frequencies, but these materials are not suitable where high temperatures, rough usage, and severe physical conditions are encountered. At elevated temperatures all become thermoplastic and lose such rigidity as they have at lower temperatures.

Preferred materials of the present invention are equal to or better than the aforesaid polymeric materials in electrical properties, and at the same time are not thermoplastic, but maintain their strength and rigidity when heated. The new materials are, therefore, ideally suited for use where low dielectric constants, high strength, and resistance to abrasion are required at elevated temperatures. In addition, materials of the present invention are structurally closely knit, and hence have practically no tendency to imbibe solvents or moisture.

In general, in the practice of the present invention, for reasons that will later appear, butadiene is first polymerized with an organic polymerization catalyst that, at the selected polymerization temperature, provides free radicals soluble in butadiene, and that leaves no harmful material existing as a separate phase that becomes occluded in the polymerization product when the operation is completed. Useful catalysts of this type are those organic catalysts dissociating to form alkoxy, alkyl, or aryl free radicals in butadiene either directly or through a mutual solvent.

The reason for employing catalysts of this particular group is to provide for the generation of the free radicals required to initiate polymerization without introducing any ash forming or harmful separate phase material that might be trapped in the polymer and require expensive purification operations for its removal.

The polybutadienes prepared by mass polymerization with organic free radicals generating catalysts for use in the present invention may be liquids, solid rubber-like, or of solid non-rubberlike form. To produce the thermal reaction products of this invention liquid polybutadiene has the advantage that it can be used to fill forms or molds without the application of pressure. Solid rubber-like or non-rubberlike polymers capable of plastic flow can also be used but with less facility to produce the products of this invention, when pressure is applied to force them into the desired shape for the thermal cross-linking reaction step.

The liquid form of the polymers may be prepared by using low concentrations of the organic free radical catalyst. For such organic catalysts as are readily dissociated the concentration of catalyst employed to yield liquid polybutadiene is usually below 2% by weight of the butadiene. At polymerization temperatures above 50° C. and preferably at 80° C., or above, the conversion of the butadiene to polybutadiene is interrupted when about 50% or less of the butadiene is polymerized, in order to obtain the liquid product. The conversion of butadiene to liquid polybutadiene and butadiene dimer can be increased with increasing polymerization temperature until temperatures of 150° C. are reached, where 90% of the butadiene can be converted and still yield liquid polybutadiene products. This is possible because a part of the butadiene is reacting to form butadiene dimer which prevents cross-linking of the liquid polymer to a solid at the polymerization temperature. At 80° C. butadiene dimer is being produced at the rate of $1/10$% per hour, at the temperature of 100° C. it is produced at the rate of $3/10$% per hour, while at 110° C. it is produced at 1% per hour, and at 150° C. at 10% per hour, based on the butadiene monomer present. As butadiene polymerizes exothermically liberating 17,600 calories per mol of monomer consumed, it is necessary to select a polymerization time or rate consistent with the rate at which this heat can be dissipated under the particular conditions of polymerization.

It has been observed that polymerization regulators or activators can be added to the organic free radical producing catalyst used in this invention to increase the rate of polymerization. Such materials as a class are those polymerizable materials having a higher rate of polymerization than butadiene, and materials that accelerate the dissociation of the catalyst to form organic free radicals. Suitable as activators for polymerization with organic free radical catalysts are vinyl and divinyl monomers in concentration varying between approximately 0.1% to 2% of the butadiene present. Divinyl benzene and acrylinitrile were found to be especially suitable for this purpose.

The temperature employed for the initial stage of polymerization is maintained below the critical temperature of the 1,3-butadiene and therefore an upper temperature limit of 152° C. is indicated for this step.

The following table illustrates sets of conditions under which liquid polybutadiene can be produced.

| Percent Catalyst | Average Pol. Temp., °C. | Pol. Time (hours) | Percent Converted | Percent Pol. | Percent Dimer |
|---|---|---|---|---|---|
| 2% B. P.[1] | 80 | 48 | 50 | 92 | 8 |
| 2% B. P. | 135 | 17 | 40 | 50 | 50 |
| 2% C. H. P.[2] | 80 | 62 | 65 | 93 | 7 |
| 2% C. H. P. | 80 | 10 | 27 | 96 | 4 |
| 2% P. N.[3] | 110 | 24 | 50 | 67 | 33 |
| 1% P. N. | 105 | 20 | 40 | 85 | 15 |
| 2% P. M. P.[4] with 50% butadiene dimer. | 105 | 24 | 91 | As indicated in the text | |
| 2% P. M. P. with 0.5% Acrylonitrile. | 105 | 20 | 92 | As indicated in the text | |
| 2% C. H. P. with 1% Divinylbenzene. | 95 | 23 | 75 | As indicated in the text | |
| 1% P. M. P. with 50% hexane. | 103 | 22 | 53 | As indicated in the text | |

[1] B. P.—benzoyl peroxide.
[2] C. H. P.—cumene hydroperoxide.
[3] P. N.—Porofor "N" (azodiisopropylcyanide).
[4] P. M. P.—p-menthane hydroperoxide.

When high conversions of butadiene to liquid polybutadiene are desired, then the dimer production can be held down by polymerizing at low temperatures for short periods of time and this is accomplished by increasing the amounts of the organic free radical catalyst which must be used and employing either a solvent, or a suitable regulator such for example as diphenyl amine or divinyl benzene.

If polymerizing conditions are employed other than those outlined herein for liquid polymers solid non-rubberlike polymers are obtained. Under special conditions, as by employing special addituents or low concentrations of modifiers such as mercaptans, rubberlike polymers are obtained.

All of the foregoing forms of the polymers prepared with organic free radical catalysts, in accordance with the present invention may be converted to the new solid materials. Where the products of this invention are to be used as dielectrics for high frequency electromagnetic wave energy it is important to maintain polar regulators or modifiers such as the mercaptan content, if present, at a minimum, and also to use minimum amounts of those exemplary catalysts specifically cited in the examples set forth hereinafter that introduce polar substances into the product.

Liquid vaporizable materials present at the end of the polymerizing step, as butadiene dimer, unreacted butadiene, etc. may be removed by vacuum treatment either prior to or following the initial stage of thermal treatment of the organic free radical formed mass polymer.

In the thermal treatment of the thus formed polymer, in the absence of butadient dimer the temperature is slowly raised to the maximum temperature range of 250 to 300° C. that is employed for the final treatment of the product. The time required to reach this final temperature is dependent on the mass of polymer employed and the efficiency with which the heat generated by cross-linking may be dissipated. Times varying between 24 and 72 hours are usually employed.

In the thermal treatment of polymer containing dimer, it is necessary to avoid the formation of permanent voids in the product being formed by conducting the thermal treatment during an initial stage, until an initial form retaining set is obtained, at a temperature at which no bubbles of vaporized dimer are formed. This temperature may somewhat exceed the 137° C. boiling point of the dimer, but preferably does not exceed 200° C. In this instance, after the initial set has been obtained, the dimer may be removed in part or in whole by evacuating and maintaining the temperature, by weathering in air, for longer periods, without maintaining the temperature, by weathering hot in the absence of air, or by releasing the dimer pressure as the thermal treatment is continued with rising temperature. If the final treatment up to the predetermined temperature limit of 250 to 300° C. is to be completed in the presence of dimer then especially the temperature rise must be effected very gradually to avoid fracture of the material.

Whether or not the final cross linking is effected in the presence of dimer, after the predetermined temperature limit is reached such temperature is maintained for a period of 48 to 96 hours, depending on the degree of hardness desired. The material becomes more dense as the cross-linking proceeds and satisfactory strength and hardness is attained when a density about equal to or greater than one is achieved.

In order to increase the rate of treatment pressure may be applied mechanically as in a mold or by fluid pressure using a liquid or an inert or reducing gas such as hydrogen or nitrogen prior to the taking of and during the initial set and may be maintained, if desired, during the period of temperature rise to the final treating temperature of 250–300° C. and even during the final period of the heat treatment. Or pressure may be first applied to the gelled product at a time before it has been heated at 250° C. for any substantial period providing a density approaching one has not been reached. The application of directional pressure after the initial set ruptures the gel, but further heating above 150° C. under pressure for a relatively short period of time reestablishes a unitary structure, the continued cross linking of which may be accomplished by heating at final treating temperatures below 300° C. with or without pressure. Accordingly, if desired, the gelled structure, until a density approaching one (i. e., a permanent set) has been attained, may be broken down and remolded under heat end pressure as just described. Because of this last fact, the gelled structure of a density less than one may be converted to the final molded and cross-linked article at any desired location and hence is a valuable article of commerce.

The nature of the invention is further illustrated by the following examples but is not restricted thereto and contemplates equivalents thereof:

Example 1

For the production of a dielectric material according to this invention: 100 parts butadiene were polymerized for 24 hours at 90 to 100° C. in a closed pressure vessel using 2 parts p-methane hydroperoxide as the organo free radical mass catalyst, and then vented to free the product of unreacted butadiene monomer. This polymerization yielded a soft elastic polymer. This polymer was then placed in the desired mold or form, which was placed in a pressure vessel and heated for a period of 24 hours at 150° C. and then for 24 hours at 270° C. The article had then attained an initial set and was form retaining. The article was then weathered in air at room temperature for six days and was then again placed in a closed vessel and the temperature raised over a period of one hour at 275° C. and held at that temperature for the ensuing 42 hours. After the final heating the product was gradually cooled at room temperature to maintain at a minimum the creation of internal strains.

The final article thus obtained, at all temperatures up to 300° C. was a hard, resilient, transparent, smooth-surfaced, solid material with a density greater than one, free of voids, cracks or checks, impervious to moisture, not attacked by acids or alkalis, resistant to solvents and to mechanical shock and abrasions, and transparent to ultra-high frequency radiant energy waves by virtue of its very low dielectric constant and power loss factor at such frequencies. The product was usable in the molded form produced and is capable of being machined, drilled, sawed or otherwise mechanically shaped to adapt it for particular applications as a dielectric or structural member.

Example 2

100 parts butadiene were polymerized for 24 hours at 90 to 100° C. in a closed pressure vessel using 1% p- menthane hydroperoxide and 1% p-chlorobenzoyl peroxide, and then vented. The polymer thus obtained was further heated for 24 hours at 150° C., during which time the initial form retaining set of the material occurred. The material was then cooled to room temperature and reheated gradually for 8 hours up to 240° C. at which temperature it was held for 24 hours and during this entire time of reheating a valve in the vessel was kept open sufficiently to bleed out and thus remove dimer vapor as formed and prevent rise of dimer pressure without exposing the product to the ambient air. The vessel was then sealed and the temperature of heating was raised gradually over a period of about 12 hours to between 275 and 280° C. and then held at that temperature for 30 hours. The sealed vessel was then cooled to room temperature over a period of 8 hours, and the completed product removed. In physical properties the product was comparable to the product of Example 1.

*Example 3*

Products similar to those of Examples 1 and 2 have been obtained employing other hydroperoxide catalysts that yield free akloxy radicals, such as cumene hydroperoxide, diisopropylbenzene hydroperoxide, cyclohexylbenzene hydroperoxide, 2,3-dimethylbutane hydroperoxide, etc., in procedures similar to those set forth above, throughout a concentration range of 0.5 to 5.0% by weight of the organic catalyst, based on the weight of butadiene. Hydroperoxide organic catalysts that yield alkoxy free radicals cointaining polar substituents in addition to the peroxide group, such as chlorodiisopropylbenzene hyperoxide or chloroisopropylbenzene hydroperoxide, may also be employed in similar manner.

*Example 4*

Similar products have also been obtained using peroxide catalysts that yield free alkoxy radicals devoid of other polar substituents, for example benzoyl peroxide. Ascaridol, tetralin peroxide, and di-tert-butyl peroxide are further examples of this class. Other peroxide catalysts that yield free alkoxy radicals containing polar substituents in addition to the peroxide group, such as p-chlorobenzoyl peroxide, may also be used.

*Example 5*

Catalysts yielding alkyl free radicals have also been employed to catalyse the polymerization in the method above described, for example azodiisopropylcyanide (sold under the trade name "Porofor N" by Farbenfabriken Bayer, of Leverkusen, Germany). Certain catalysts of this class such as hexaphenyl ethane and its substitution products with non-polar substituents, can dissociate and polymerize butadiene to yield products devoid of polar ingredients, and hence with the lowest possible dielectric constants for hydrocarbons.

*Example 6*

Catalysts yielding aryl free radicals may be employed in lieu of those referred to in Example 5. These include diazoaminobenzene, p-diazotoluene-aniline, p-diazotoluene-p-toluidine, etc. Aryl free radical catalysts that introduce no polar constituents or residues into the polymer when dissociated, like the similarly characterized alkyl free radical catalysts, can also yield products ideal from the standpoint of transparency to ultra-high frequency electromagnetic waves, providing care is exercised to prevent oxidation in the production of the material.

Where aryl free radical catalysts and other organo free radical catalysts are employed that have higher molecular weights than those mentioned in the preceding examples, the quantities required will be somewhat greater, on a weight basis.

*Example 7*

Without sacrifice of the high frequency electrical properties of the products of Examples 1 and 2, various non-polar additituents may be incorporated either before or after the polymerizing step as long as the material has not attained a permanent set, which state occurs when the thermally treated polymer attains a density of one or higher.

*Example 8*

If the other physical properties are to be substantially realized but with some sacrifice of dielectric properties of the article, polar or semi-polar additituents may be incorporated at any time prior to the taking of the permanent set.

It is to be understood that the embodiments and examples herein set forth are illustrative and not restrictive of the invention, the scope of which is defined in the appended claims, and that modifications and changes that come within the meaning or range of equivalency of the claims are intended to be secured thereby.

I claim:

1. A process for producing a resin product by thermal treatment of butadiene homopolymer, said butadiene homopolymer having been prepared by mass polymerization of butadiene with a catalyst selected from the group consisting of organic-peroxide, organic-hydroperoxide, and organic-azo polymerization catalysts and containing butadiene dimer, particularly characterized in that the said butadiene homopolymer is heated to a temperature of about 150° C. to 270° C. under pressure for a period of about 24 to 48 hours to produce an initial gelling of the polymer, after which dimer is vaporized therefrom, and then thermally treated under pressure at temperatures between 250° C. and 300° C. for a period of about 42 to 96 hours to convert the gelled product to an insoluble, infusible, resin having a density greater than one.

2. A process according to claim 1, in which the gelled homopolymer is cooled to room temperature and then weathered for a period of about six days to effect the vaporization of dimer.

3. A prcess according to claim 1, in which the gelled homopolymer is heated gradually to about 240° C. in a vented container and held therein at such temperature with the container vented for about one day to effect the vaporization of dimer without exposure to the atmosphere before being sealed for the final thermal treatment.

4. The insoluble, infusible, resinous product of the process of claim 1.

References Cited in the file of this patent

UNITED STATES PATENTS

| 1,901,044 | Schmidt et al. | Mar. 14, 1933 |
| 2,582,693 | Gleason | Jan. 15, 1952 |
| 2,622,077 | Park et al. | Dec. 16, 1952 |

FOREIGN PATENTS

| 365,102 | Great Britain | July 7, 1930 |